United States Patent
Mansfield, Jr.

(10) Patent No.: US 8,180,669 B2
(45) Date of Patent: May 15, 2012

(54) PRODUCT RECALL USING CUSTOMER PRIOR SHOPPING HISTORY DATA

(75) Inventor: Richard B. Mansfield, Jr., Woodridge, IL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 2731 days.

(21) Appl. No.: 10/501,141

(22) PCT Filed: Apr. 4, 2002

(86) PCT No.: PCT/US02/08236
§ 371 (c)(1),
(2), (4) Date: Jul. 13, 2004

(87) PCT Pub. No.: WO03/085578
PCT Pub. Date: Oct. 16, 2003

(65) Prior Publication Data
US 2004/0267608 A1      Dec. 30, 2004

(51) Int. Cl.
*G06Q 30/00* (2006.01)
(52) U.S. Cl. ............... 705/14.11; 705/14.34; 705/14.37; 705/14.1
(58) Field of Classification Search ............... 705/14.11, 705/14.34, 14.37, 14.1
See application file for complete search history.

(56) References Cited

U.S. PATENT DOCUMENTS

| | | |
|---|---|---|
| 5,978,774 A | 11/1999 | Rogers |
| 2001/0042008 A1 | 11/2001 | Hull et al. |
| 2001/0053980 A1 | 12/2001 | Suliman, Jr. et al. |
| 2001/0056359 A1 | 12/2001 | Abreu |
| 2002/0040325 A1 | 4/2002 | Takae et al. |
| 2003/0074272 A1* | 4/2003 | Knegendorf et al. ........... 705/26 |

FOREIGN PATENT DOCUMENTS

WO        WO 01/97131        12/2001

OTHER PUBLICATIONS

Gilje, Shelby, "Jugs, Pans Pose a Lead Hazard," Seattle Times, Third Edition, Jun. 25, 1986, p. C7.*
Smart Money, Product recalls rebate for coffee makers, extended muffler coverage, Nassau and Suffolk Edition, Newsday, Feb. 5, 1992, p. 43.*
Quotes: Dear Doctor: I own a 1992; Nassau Edition, Newsday, Aug. 27, 1999, p. D13.*
Nov. 29, 2002, PCT International Search Report PCT/US02/08236.
Jun. 15, 2007, Supplementary European Search Report EP 02715146.
Jan. 1, 1998 [Anonymous] "Product Recalls—Household Products" Consumer Reports, vol. 63, No. 13, pp. 328-334, 1998.

* cited by examiner

*Primary Examiner* — Michael Bekerman
(74) *Attorney, Agent, or Firm* — Pillsbury Winthrop Shaw Pitman LLP

(57) ABSTRACT

A system for determining customer identifiers (CIDs) associated with purchase of product items which are recalled includes a computer database management system (10, 20) and network (30). Consumers associated with the determined CIDs are notified of the recall of the products.

22 Claims, 3 Drawing Sheets

PRODUCT RECALL USING CUSTOMER PRIOR SHOPPING HISTORY DATA

FIELD OF THE INVENTION

This invention relates to the field of POS marketing.

BACKGROUND

Point of sale (POS) computer systems are digital computer systems that track product purchases and transaction amounts received at POS terminals. POS terminals are terminals where store transactions take place and sales transaction data is input to the POS computer system.

POS marketing refers to the field of marketing to consumers when consumers are at the POS by using POS computer systems.

The term product recall means a notification of purchasers of a product that the product should not be used for its intended purpose. Products are recalled due to defects noticed after the products have been distributed by a manufacturer. Product defects leading to product recalls range from very minor to life threatening.

A customer identification (CID) means an identification associated with purchased product items. A CID may be stored in memory of a POS computer system in association with identifications of goods or services purchased in a retail store. A CID may be associated with a single person or a group of people, such as members of the same family or people having the same residence address as one another.

SUMMARY OF THE INVENTION

An object of this invention is enable manufacturers and retailers to notify consumers who have purchased a product that the product is recalled.

Another object of the invention is to account both for product items returned by consumers as a result of the recall and the consumers who have returned the recalled product items.

Another object of the invention is to enable retailers and manufacturers to target market to consumers depending upon whether the consumers have purchased a recalled product, and to target market to consumers who have purchased a recalled product depending upon whether the consumers actually received notification of the recall, whether the consumers have or have not returned their purchased recalled product items, depending upon the manner of notification and the manner of the consumers' return of the recalled product items.

These and the other objects noted below are accomplished by novel programming stored on a computer storage media (referred to as a computer program product), computer database management systems, computer network systems, and method of using the computer network systems, programming and database management systems to perform the steps of entering identifications of products being recalled into a computer system, determining Customer Identifications (CIDs) associated with a purchase of the products being recalled, and transmitting recall notifications to the persons or households associated with the CIDS. The mechanism of transmitting the recall notification to the person or household may be by using a POS terminal or Kiosk when a CID to which the recall applies is entered at the POS terminal or Kiosk, by transmission to a postal address associated with the CID, by transmission of email to an email address associated with the CID, and by transmission of a web page to a client computer with which the CID is associated.

In one aspect, the invention comprises a computer network implemented system and method for recalling products capable of performing the steps of determining CIDs associated with purchase of product items associated with a recall; and notifying consumers associated with the determined CIDs of the recall. Other aspects of the invention include system structure and programming for performing the steps of: determining products previously purchased in association with a CID; determining if products previously purchased meet a rebate specification; determining whether data indicating a product previously purchased in association with a CID meets a recall specification; determining a UPC associated with the recall; transmitting a recall notification to a POS terminal or kiosk when a determined CID is entered at the POS terminal or kiosk; transmitting a recall notification via postal mail to an address associated with a determined CID; transmitting a recall notification via email to an email address associated with a determined CID; transmitting from a web site to a user's computer a recall notification in response to a prompt received for the user's computer for a personal web page associated with a determined CID; transmitting a refund, a rebate, or an incentive along with the recall notification; transmitting to a consumer encoded indicia identifying a CID associated with the consumer and recall instructions along with the notification; determining CIDs subject to a recall notification based at least in part on a recall specification and CIDs stored in association with data indicating prior product purchases; transmitting determined CIDs to another computer system; transmitting determined CIDs associated with one retail computer system to that retailer computer system; generating bar coded documents containing a determined CID and recall specification; accounting for return of recalled goods; entering into a computer system a CID associated with returned goods; entering accounting date at a POS terminal in a retail store; entering accounting data at a postal mail service provider facility, determining the efficacy of notifying; accounting for costs associated with said recalling products; target marketing to consumers associated with determined CIDs; further target re-marketing to consumers associated with determined CIDs depending upon consumer responses to initial target marketing.

In another aspect, the invention comprises a computer network implementing a method for recalling products, comprising the steps of receiving at a central server computer system a recall specification; determining, at the central computer system, retailer stores that received product items subject to recall, and specification of product received by each retail store subject to recall; and notifying retailers whose stores received recalled product of the product items and associated recall specification. In this aspect, the invention may also include notifying a consumer associated with a CID associated with purchase of a product item meeting said recall specification.

In another aspect, the invention comprises a database management system comprising means for entering and retrieving date in a database; a database storing CIDs in association with prior purchase of product items; means for determining, based upon a recall specification, which prior purchase of product items stood in the database are for product items associated with a recall; means for determining CIDs associated with purchase of product items associated with a recall; and means for transmitting or storing determined CIDs.

BRIEF DESCRIPTION OF THE DRAWINGS

The invention is illustrated with reference to the figures wherein.

DETAILED DESCRIPTION OF THE PREFERRED EMBODIMENTS

Figure 1:
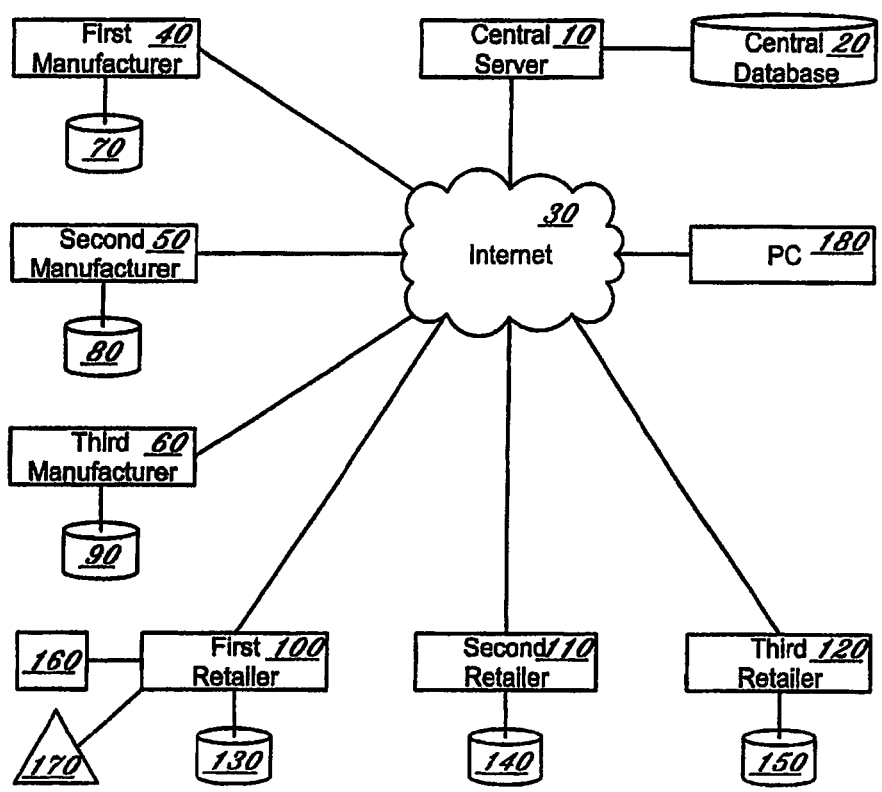
FIG. 1 is a schematic of a computer network system.

FIG. 1 shows a computer network system including the following elements: central server computer system 10; central database 20; Internet 30; manufacturer computer system 40; manufacturer computer system 50; manufacturer computer system 60; manufacturer computer system database 70; manufacturer computer system database 80; manufacturer computer system database 90; retailer computer system 100; retailer computer system 110; retailer computer system 120; retailer computer system database 130; retailer computer system database 140; retailer computer system database 150; POS terminal 160; kiosk 170; and personal computer (PC) 180.

FIG. 1 shows manufacturer computer system 40 connected by a data line to manufacturer computer system database 70. This data line indicates that computer system 40 stores and retrieves data from database 70. Similarly, FIG. 1 shows data lines connecting each computer system to a database from which the computer system can read and write data FIG. 1 shows each computer system connected by a data line to the Internet 30. POS terminal 160 is associated with a first retailer's store and communicates with retailer computer system 100. Kiosk 170 comprises a data communication terminal at which a consumer can receive from and transmit to the first retailer computer system certain data. PC 180 comprises a computer capable of prompting for, receiving, and displaying web pages transmitted from servers running web server software.

Preferably, first, second and third manufacturers use moots computer systems 40, 50, 60, respectively to support their business. Preferably, first, second, and third retailers use retailer computer systems 100, 110, 120, respectively, to support their business. Preferably, a service company uses central server computer system 10 to support its business.

The number or manufacturers, retailers, and service company computer systems shown in FIG. 1, the number of databases attached to each computer system, and the use of the Internet 30 are each exemplary, and are not necessary or limiting to the invention further disclosed and claimed herein. Each computer system typically includes at least one central processing unit, memory for assisting the central processing unit in processing data, disk storage media, input/output devices for receiving and transmitting data to other computer system and to user devices, and operating system software for coordinating operation of applications software and data flow. Data transmission lines represent both network cable and wireless transmission/reception hardware.

Figure 2:
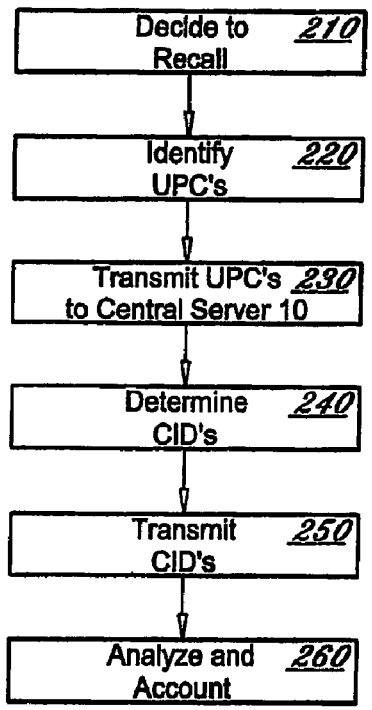
FIG. 2 is a flow chart showing high level steps for performing an embodiment of the invention.

FIG. 2 is a flow chart showing in step 210 deciding to recall, in step 220 identifying Universal Product Codes (UPCs), in step 230 transmitting UPCs to central server computer system 10, in step 240 determining CIDs, in step 250 transmitting CIDs, and in step 260 analyzing and accounting.

In step 210, a manufacturer decides to recall. Preferably, the manufacturer determines the specification of the recall. Typically, the recall specification defines at least one product UPC, identifiable product items, geographic regions, time periods (e.g., date ranges), retailers, and specific stores. The recall specification defines the scope of the recall and any data that accomplishes this goal may be used for this invention. It should be noted that identification of the product without any other limitations would indicate a general recall of all outstanding product items for that product.

The recall specification may also include terms of any refund, rebate, or incentive available from the manufacturer to be offered in association with the recall. An example of a refund is currency value in the amount of manufacturer's suggested retail price, or in the amount of price shown on proof of purchase. Examples of a rebate are (1) a check for a fixed currency amount and (2) a store voucher for a fixed discount amount upon a consumer providing proof of purchase of specified products of the manufacturer issuing the recall. More specifically, the manufacturer could offer a rebate to a consumer who had purchased a product item subject to recall upon the consumer providing to the manufacturer proof of purchase of another product item for the same product and which is not subject to recall. An example of an incentive is a discount obtained from the retailer upon the price of a subsequent purchase of a specified product item made by the manufacturer at the time of the subsequent purchase.

In step 220, as part of the recall specification, preferably, the manufacturer identifies the UPC or UPCs of the product or products being recalled.

In step 230, relevant portions of the recall specification, preferably including the UPCs of the products being recalled, are received in the central server computer system 10. A user of the central computer system 10 may enter the recall specification data into central computer system 10. Alternatively, the recall specification may be automatically received at the central server computer system 10 in a transmission sent from the manufacturer computer system of the manufacturer issuing the recall.

In step 240, in a preferred embodiment, central computer system 10 identifies CIDs associated with purchased of product items that meet the specification of the recall. Central server computer system 10 may store the CID information in central database 20. Each CID may be stored in database 20 in association with data indicating any of the following: retailer; specific store identification; consumer's name; consumer's family name; names of family members; names of members having the same residence address; residence address; purchase transaction dates; product items purchased in association with the CID; dates or purchase of each product item purchased in association with the CID; incentives offered to the person(s) using the CID; redemption data for incentives offered in association with the CID; and related demographic information. Other data may be stored in association with each CID. The data associated with each CID is preferably stored in a relational database in which relations between different fields of data is well defined.

In step 240, alternatively or in addition, central computer system 10 may identify non CID information meeting the recall specification, including retailer identifications, specific retail stores, product item production batch, lot, and serial numbers.

In step 250, the central computer system 10 transmits CIDs meeting the recall specification for delivery of recall notification to the person or persons associated with the CIDs as further described below in connection with FIG. 3.

In step 260, one or more of the aforementioned computer systems analyzes data indicating efficacy of the recall, accounts for service charges for the recall, and generates targeted marketing depending upon that data as further described below in connection with FIG. 4.

Figure 3:
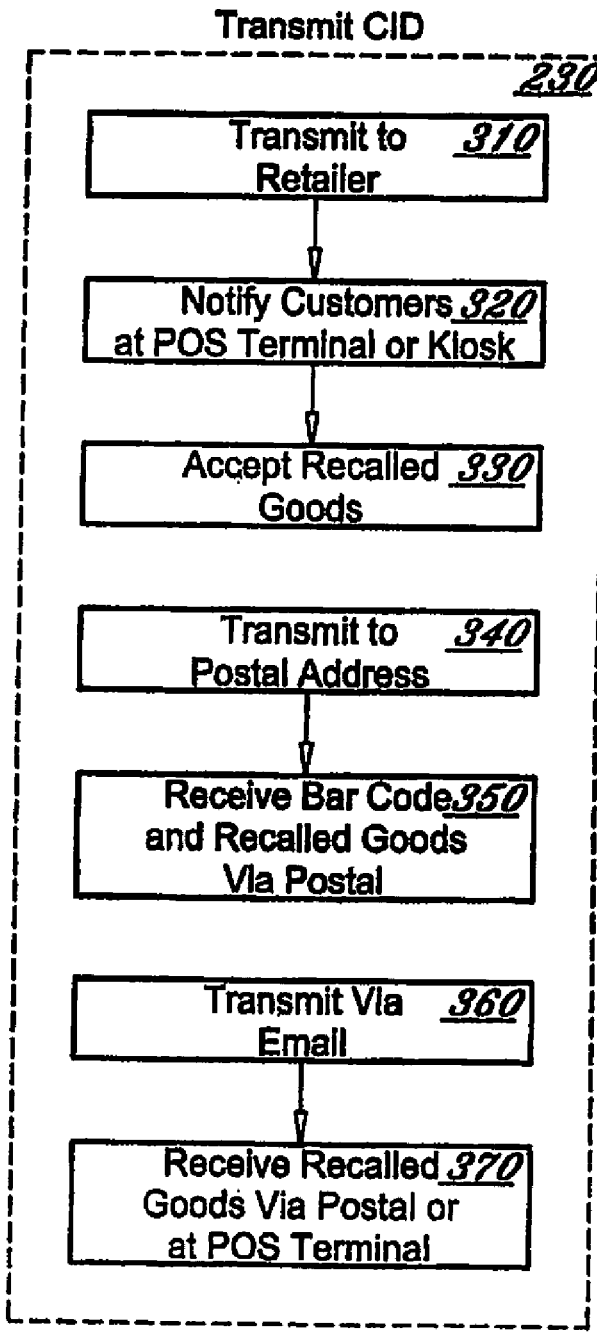
FIG. 3. is a flow chart showing steps of three embodiments of performing step 250 of FIG. 2.

FIG. 3 shows a flow chart containing steps of embodiments for transmitting to the consumers associated with CIDs meeting the recall specification. Specifically, consumers meet the recall specification when prior purchase data associated with their CID indicates that the consumer had previously purchased a product item meeting the recall specification.

In step 310, the central server computer system 10 transmits CIDs meeting the recall specification to retailers. Usually each CID is associated with either one retail store or one retailer's chain of retail stores. The central server computer system determines from the recall specification which CIDs are associated with purchases of the recall, and the retail stores with which the CID is associated. The central server transmits the recall notification for a specified CID to the associated retail store's computer system, or to a computer system that interacts with the retail store's computer system sufficiently to enable conveying information to a consumer at a point of sale (POS) terminal of a store managed by the aforementioned retail store computer system.

In step 320, a consumer at either a POS terminal or a kiosk in the retail store is identified by one of the specified CIDs. The CID is entered into the retail store's computer system. Either the retail store's computer system or a computer system communication therewith (i.e., either another local computer system or the remote central server computer system 10) determines that the received CID is associated with the recall and transmits instructions to notify the consumer of the recall. While the consumer is interacting with the POS terminal or the kiosk, the POS terminal, the kiosk, or hardware adjacent thereto provides to the consumer notification of the recall. Notification may be in the form of a screen display, audible message, or a printed message. The notification may also include notification of terms of any refund, rebate, or incentive. As part of the consumer's interaction with the kiosk or POS terminal, the consumer may be provided any refund due in accordance with the recall specification.

In step 330, the store, the manufacturer, or a recall service provider (generally, the recall processor) accepts recalled goods from consumers. As part of that process, the recall processor may enter data indicating the consumer's CID, provide any of a refund, rebate, and incentive, and enter into a computer system accounting information identifying the refund, rebate, and incentive provided to the consumer.

In step 340, as a first alternative method for notifying consumers of a recall, a recall notification is mailed to postal addresses associated with a CID meeting the recall specification. Consumers receive via postal mail an encoded, preferably bar coded, paper. Preferably, the postal mailed recall notices include a bar coded paper encoding the CID associated with the postal address. The bar coded paper may also encode the recall product specification or relevant portions thereof. The recall specification encoding may subsequently be used to ensure that the product items the consumers return actually meet the recall specification. The postal mailed notices preferably include instructions for consumers to both identify recalled products and return recalled products. The postal mailed notices may also include or be associated with refunds, rebates, and incentives associated with the recall specification.

In order to facilitate step 340, preferably central server computer system 10 determines postal addresses associated with CIDs meeting the recall specification and then transmit the CIDs and recall product specification data to a postal mailing service provider. The postal mail service provider may be part of the central server computer system or it may be a computer system controlled by a different legal entity. Alternatively, the central server computer system may transmit the CID and recall specification data to an Input/output device, and a user may then convey the CID and recall specification data to a postal mail service provider. The postal ail service provider may print and mail recall notices to the postal addresses associated with the CIDs. Alternatively, each retailer or retail store computer system, having received CIDs and recall specifications associated with a recall may generate postal mailing instructions and convey the postal mailing instructions to a postal mailing service provider.

In step 350, the postal mail service provider, the retail store, or another entity receives by postal mail bar coded postal mailed papers and product items mailed by consumers in response to the recall notification. As in step 330, preferably the CID, the recalled product information, and whether the returned product meets the recall specification are determined from the contents of the postal mailing and entered into memory of a computer system, such as system 10.

In step 360, as a second alternative for notifying consumers of a recall, central server computer system 10 or a retailer computer system emails the notifications and associated information discussed above to email addresses associated with CIDs meeting the recall specification. The email may be accompanied by data defining the CID, the recall specification, instructions for the consumer to determine what product meets the recall specification, and instructions how to return the recalled product item. The email may include printable machine readable indicia encoding the consumer's CID and the recall specification.

In step 370, recalled product items are received either via postal mail or in retail stores at a POS terminal or service terminal.

In a third alternative, the consumer may be notified by receiving a personal web page when pointing their computer's browser to a web site at which the have a personal web page associated with their CID.

In the foregoing embodiments described with reference to FIG. 3, an important step is determining CIDs associated with a prior purchase of a product item subject to recall. Preferably, central server computer system performs that function. Alternatively, a distributed set of computer systems, such as one storing data for each region of a country, or one storing data for each retailer could perform that function.

Other means than those specifically disclosed above for conveying the recall information to the consumers whose CIDs meet the recall specification are possible and are within the scope of this invention.

Figure 4:
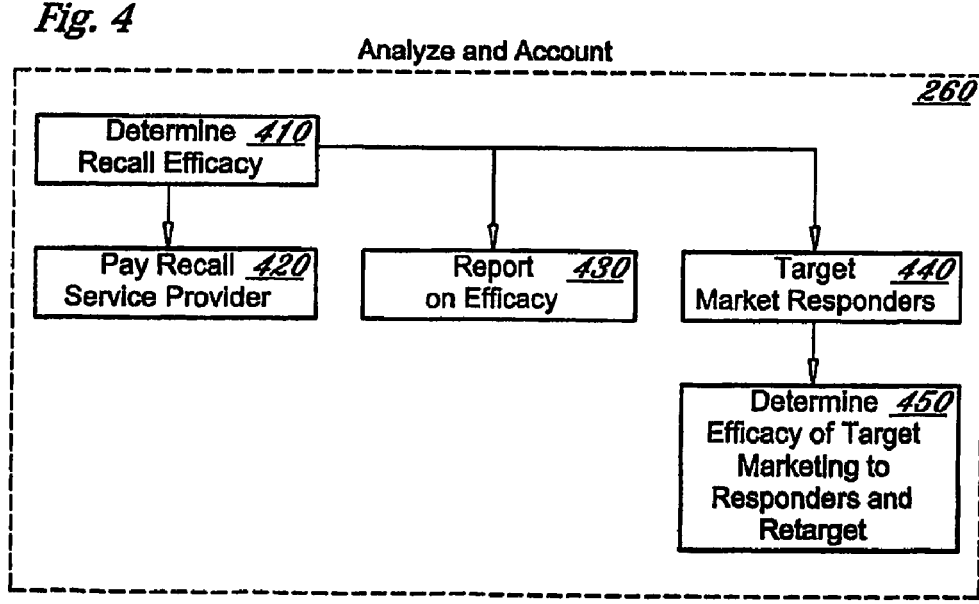
FIG. 4 is a flow chart showing steps of an embodiment for performing step 260 of FIG. 2.

FIG. 4 shows a flow chart illustrating steps for analyzing and accounting for a recall program. In step 410, the recall program efficacy is determined, in step 420 the recall program service provider is paid, in step 430 a report on recall efficacy is generated, in step 440 recall responders are targeted for subsequent marketing, and in step 450 results of the targeted marketing are used to improve targeting to those responders.

In step 410, preferably the central server computer system 10 determines efficacy of the recall program, for example, by comparing the number of products recalled from consumers receiving notifications at the POS, kiosk, postal mail, email, and web page view, to the number of such notifications, and breaks down the comparison based upon demographic information for the consumers.

In step 420, preferably the central server computer system 10 determines a service charge for the CID based recall program. The service charge may be based upon a measure of the efficacy of the recall program. The service charge may be based upon the number of CIDs meeting the recall specification, the number of postal mailing, the number of emailings, the number of POS or kiosk recall notifications, number of retailers, number of retail stores, and the number of product items returned, or any combination of the foregoing. Alternatively, the rebate program may be charged at a flat fee or in a manner that does not require processing of data by central server computer system 10.

In step 430, central server computer system 10 generates a report. The report may include any of the efficacy comparisons mentioned above. In addition, the report may include costs associated with the rebate program and revenues generated to the server provider of the rebate program.

In step 440, the central server computer system may run code for generating a follow up target marketing program. In this program consumers may be targeted based upon whether they responded to the product recall, whether they acted on any rebate or incentive associated with the product recall, and whether they have subsequently purchased additional items of the product subject to the recall. An example is providing to a consumer a relatively large incentive if the consumer has not subsequently purchased a product item of a product subject the prior recall, and offering a consumer that has subsequently purchased such product items for the product that was subject to the recall either a relatively smaller incentive to purchase another product item for the recalled product or to purchase an item of some other product made by the same manufacturer. The process of targeting based upon the consumers responses to the target marketing resulting from the recall program may be iterative, so that the incentives subsequently offered to consumers depend upon their responses to previous rounds of incentives relating to the recall program.

In an alternative embodiment to notifying consumers based upon CIDs, the central server computer system 10 may determines stores, lots shipped to those stores, and product dates that meet the product recall specification, and send notifications or instructions for recall to retailers meeting the recall specification, either as an alternative to notifying consumers via CIDs that meet the recall specification or in addition thereto. For example, the cost of postal mailing recall notifications and POS notification to consumers may prohibit that activity, but not prohibit email notification. This may occur when the recall specification identifies a very low level of importance to the recall, and in which the manufacturer is not willing to pay costs for a comprehensive recall program. Accordingly, central server computer system 10 may email notifications to email addresses of those CIDs meeting the recall specification, if known, and transmit notification and instructions to those retailers that central server computer system 10 determines have received product meeting the recall specification.

In one embodiment the CIDs are frequent shopper card identifications, or are IDs derived from frequent shopper card identifications. Retailers that have frequent shopper card IDs typically also have sensitive personal information, such as name and address information associated with the frequent shopper card CIDs. One embodiment of the operation of the inventive system disclosed above preserves confidentiality of the sensitive personal information while performing a recall function on behalf of manufacturers by not disclosing to the manufacturers the sensitive personal information. Thus, the accounting functions of the inventive systems and methods discussed above may provide only summary information on numbers of consumers participating in a rebate recall, number of consumers provided the recall notification. The accounting functions may be programmed to preclude divulging frequent shopper card based CIDs or any CIDs to the manufacturer that sponsored a recall program.

CIDs may also be based on numbers or identifications contained in credit card, check cashing cards, checks, or any other card or payment instrument which consumers use. If the consumer consistently uses the same such instrument in retail store transactions, then the central server computer system 10 can store a record that associates plural transactions with a single CID, thereby enabling analysis of a shopping pattern associated with the CID, and thereby enabling the central server computer system to make prior shopping history based determinations, such as the CID specific recall notification decisions discussed above.

The invention has been described with reference to specific embodiments. However, the inventive concept disclosed is broader than the specific embodiments, and the scope of the invention is more properly defined by the following claims construed to include known equivalents to claimed elements and steps and all known structure for performing the claimed means elements.

What is claimed is:

1. A computer network implemented method for recalling product items for a product subject to a recall, comprising:

determining, in a computer system, a CID associated with a product identification of said product subject to said recall, thereby indicating prior purchase by a person associated with said CID of a first product item of said product; and thereafter, in response to identifying at a terminal or kiosk of a retail store computer system, said CID, thereby indicating the presence of said person at said terminal or kiosk, providing to said person via said terminal or kiosk a notification of said recall for said product and offering to said person via said terminal or kiosk at least one of (1) a rebate when there is proof of purchase of a second product item for the same product as said first product item subject to said recall but which said second product item is not subject to said recall and (2) an incentive associated with said recall such that said incentive offers a discount upon the price of a subsequent purchase of a specified product item.

2. The method of claim 1 wherein the step of determining comprises determining a UPC associated with said recall.

3. The method of claim 1 further comprising transmitting a refund along with the recall notification.

4. The method of claim 1 wherein a central server computer system performs said step of determining based at least in part on a recall specification and CIDs stored in association with data indicating prior product purchases.

5. The method of claim 1 further comprising a central server computer system transmitting said determined CIDs to another computer system.

6. The method of claim 1 further comprising the step of transmitting determined CIDs associated with one retail computer system to that retailer computer system.

7. The method of claim 1 further comprising the step of generating bar coded documents containing a determined CID and recall specification.

8. The method of claim 1 further comprising the step of accounting for return of recalled goods.

9. The method of claim 8 comprising entering into a computer system a CID associated with returned goods.

10. The method of claim 8 wherein said accounting occurs at a POS terminal in a retail store.

11. The method of claim 8 wherein said accounting occurs at a postal mail service provider facility.

12. The method of claim 1 further comprising determining the efficacy of said step of notifying.

13. The method of claim 1 further comprising accounting for costs associated with said recall.

14. The method of claim 1 further comprising target marketing to consumers associated with said determined CIDs.

15. The method of claim 14 further comprising further target re-marketing to said consumers associated with said determined CIDs depending upon consumer responses to said target marketing.

16. The method of claim 1 comprising offering to said person via said terminal or kiosk said rebate.

17. The method of claim 1 comprising offering to said person via said terminal or kiosk said incentive.

18. The method of claim 1 wherein said step of providing comprises receiving at said terminal or kiosk said proof of purchase in association with said CID, thereby indicating the presence of said person at said terminal or kiosk, such that providing said rebate is in response to receipt at said terminal or kiosk from said person of said proof of purchase.

19. A computer network system for recalling product items for a product subject to a recall, comprising:
 a computer system for determining a CID associated with a product identification of said product subject to said recall, thereby indicating prior purchase by a person associated with said CID of a first product item of said product subject to said recall; and
 a retail store computer system having a terminal or kiosk that is configured to respond to identification of said CID at said terminal or kiosk, thereby indicating the presence of said person at said terminal or kiosk, by providing to said person via said terminal or kiosk a notification of said recall for said product and offering to said person via said terminal or kiosk at least one of (1) a rebate when there is proof of purchase of a second product item for the same product subject to said recall but which said second product item is not subject to said recall and (2) an incentive associated with said recall such that said incentive offers a discount upon the price of a subsequent purchase of a specified product item.

20. The system of claim 19 wherein said retail store computer system is designed to offer to said person said rebate.

21. The system of claim 19 wherein said retail store computer system is designed to offer to said person said incentive.

22. The system of claim 19 wherein said terminal or kiosk is configured to receive said proof of purchase in association with said CID, thereby indicating the presence of said person at said terminal or kiosk, such that system is configured to provide said rebate is in response to receipt at said terminal or kiosk from said person of said proof of purchase.

* * * * *